(12) United States Patent
Alotaibi

(10) Patent No.: US 12,156,774 B1
(45) Date of Patent: Dec. 3, 2024

(54) DRY MOUTH HYDRATING DEVICE

(71) Applicant: KING FAISAL UNIVERSITY, Al-Ahsa (SA)

(72) Inventor: Mansour M. Alotaibi, Al-Ahsa (SA)

(73) Assignee: KING FAISAL UNIVERSITY, Al-Ahsa (SA)

( * ) Notice: Subject to any disclaimer, the term of this patent is extended or adjusted under 35 U.S.C. 154(b) by 0 days.

(21) Appl. No.: 18/200,820

(22) Filed: May 23, 2023

(51) Int. Cl.
*A61C 19/06* (2006.01)

(52) U.S. Cl.
CPC ................... *A61C 19/063* (2013.01)

(58) Field of Classification Search
CPC .... A61C 19/063; A61C 17/024; A61M 5/142; A61J 7/0053
See application file for complete search history.

(56) References Cited

U.S. PATENT DOCUMENTS

| | | | |
|---|---|---|---|
| 2008/0255498 A1* | 10/2008 | Houle | A61C 17/0208 604/20 |
| 2008/0272153 A1* | 11/2008 | Hochstadter | A61C 13/01 222/373 |
| 2015/0258417 A1 | 9/2015 | Rodgers et al. | |
| 2018/0071611 A1* | 3/2018 | Durbin | A63B 71/085 |
| 2022/0323191 A1* | 10/2022 | Stokkelien | A61C 19/063 |

FOREIGN PATENT DOCUMENTS

WO 2013014172 A2 1/2013

OTHER PUBLICATIONS https://www.mountainside-medical.com/products/exel-iv-administration-set-15-drop-2-injection-sites-105-tubing (Year: 2020).*

* cited by examiner

*Primary Examiner* — Cris L. Rodriguez
*Assistant Examiner* — Luis Ruiz Martin
(74) *Attorney, Agent, or Firm* — Nath, Goldberg & Meyer; Joshua B. Goldberg

(57) ABSTRACT

A dry mouth hydrating device includes a generally U-shaped tray having a base and two parallel arms extending from the base; a cavity defined within the tray providing a reservoir for the placement of a liquid; a first aperture defined in the base of the tray, in communication with the cavity; and tubing provided between the first aperture and the cavity for allowing the liquid to flow out of the cavity at a desired rate. The tray is adapted to surround the upper teeth of the wearer and to be retained within the oral cavity along the dental arch between the lips and gums. Once positioned on the upper teeth of the wearer, liquid can drip from the cavity over the tongue of a user wearing the device for treating or preventing xerostomia. A second, resealable aperture may be defined in communication with the cavity to allow the cavity to be refilled.

13 Claims, 3 Drawing Sheets

DRY MOUTH HYDRATING DEVICE

BACKGROUND OF THE INVENTION

Field of the Invention

The disclosure of the present patent application relates to a device for treating dry mouth, and particularly, to a dry mouth hydrating device wearable by a user during sleep.

Description of Related Art

Studies show that dry mouth, or xerostomia as termed in the medical field, plagues as much as 25% of the U.S. population, and many more people around the world. The affected population consists primarily of persons over the age of 65. In fact, current estimates indicate that approximately 30% of persons over the age of 65 are affected by xerostomia. Xerostomia occurs due to a lack of saliva in the mouth and can cause discomfort and difficulty in speech and eating. Some studies have shown xerostomia can lead to halitosis and a dramatic rise in the number of cavities, as the protective effect of saliva is no longer present, and can make the mucosa of the mouth more vulnerable to infection.

Xerostomia may be a sign of an underlying disease, such as Sjögren's syndrome, poorly controlled diabetes, or Eaton-Lambert syndrome. Other causes of xerostomia include side effects of drugs, medications, or alcohol, trauma to the salivary glands or their ducts or nerves, dehydration, excessive mouth breathing, previous radiation therapy, and a natural result of aging. The vast majority of elderly individuals will suffer xerostomia to some degree.

Xerostomia often has a negative effect on the lifestyle of people suffering therefrom. While those affected by xerostomia can be uncomfortable throughout the day, most suffer during the evening while trying to sleep. Continual dry mouth can cause many sleepless nights.

Accordingly, a dry mouth hydrating device solving the aforementioned problems is desired.

SUMMARY OF THE INVENTION

According to an embodiment, a dry mouth hydrating device includes a generally U-shaped tray having a base and two parallel arms extending from the base. The tray is adapted to surround the upper teeth of the wearer and is retained within the oral cavity along the dental arch between the lips and gums. A cavity is defined within the tray that provides a reservoir for the placement of a liquid. A first aperture can be defined in the base of the tray, in communication with the cavity. Tubing, e.g., macro drip tubing, can be provided between the first aperture and the cavity for allowing the liquid to flow out of the cavity at a desired rate. The cavity is generally in the shape of the device and extends within the base and arms of the device. Once positioned on the upper teeth of the wearer, liquid can drip from the cavity over the tongue of a user wearing the device. A pH of the liquid can be the same as saliva in the user's mouth. According to an embodiment, the dry mouth hydrating device can be worn by a user while sleeping for treating or preventing xerostomia.

According to an embodiment, a second aperture can be defined in the tray, in communication with the cavity, for receiving a hydrating liquid in the cavity.

A method of treating or preventing dry mouth can include, according to an embodiment, positioning the dry mouth hydrating device on the upper teeth of the wearer; and transporting the hydrating liquid from the cavity, through the aperture, and into the mouth of the wearer.

A kit for treating or preventing dry mouth can include a dry mouth hydrating device and a bottle including a hydrating liquid, the dry mouth hydrating device including a generally U-shaped tray having a base and two parallel arms extending from the base, a cavity defined within the tray that provides a reservoir for the placement of a liquid, a first aperture defined in the base of the tray, in communication with the cavity, a second aperture defined in the tray, in communication with the cavity, and a tubing portion provided between the first aperture and the cavity for allowing the liquid to flow out of the cavity at a desired rate.

These and other features of the present subject matter will become readily apparent upon further review of the following specification.

BRIEF DESCRIPTION OF DRAWINGS

Similar reference characters denote corresponding features consistently throughout the attached drawings.

DETAILED DESCRIPTION

Figure 1:
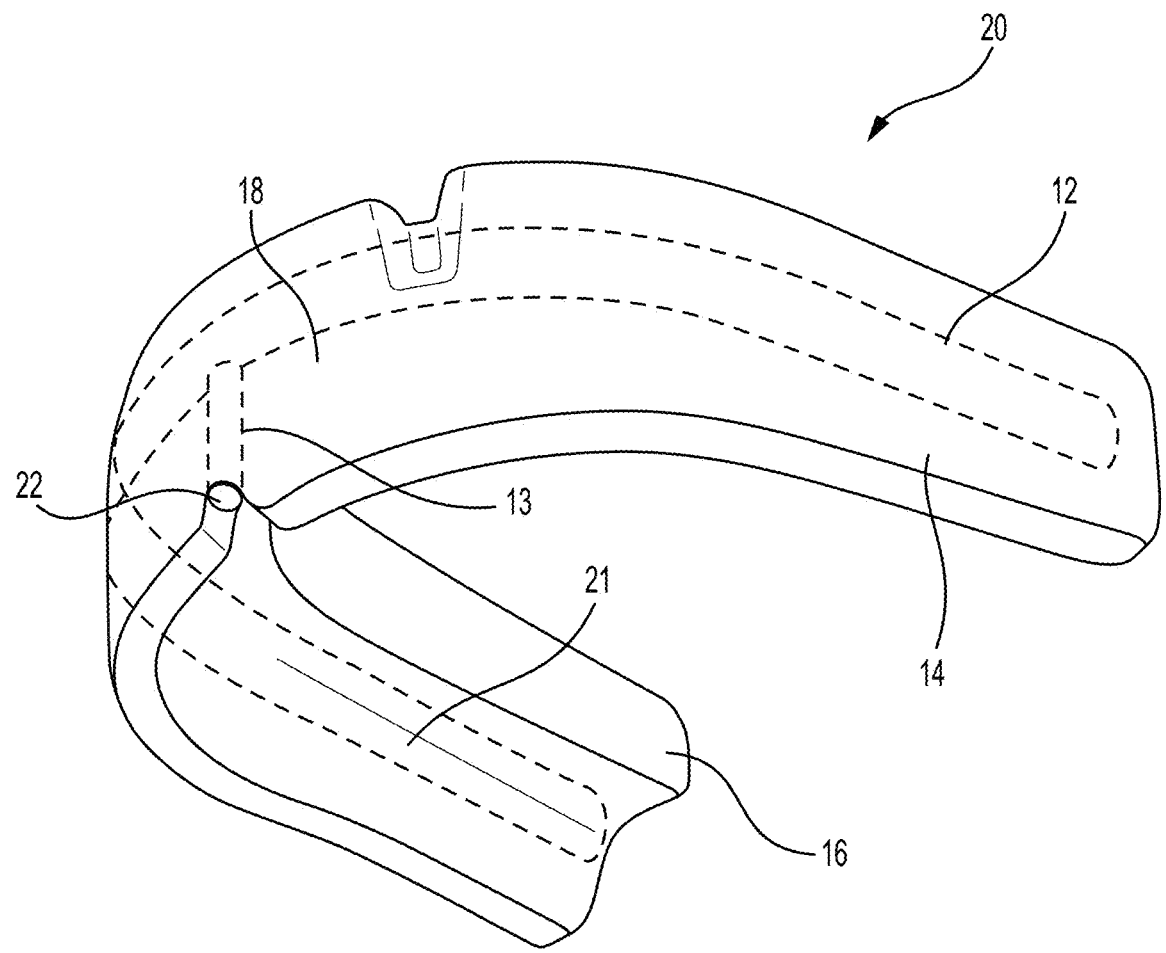
FIG. 1 is a perspective view of a first embodiment of a dry mouth hydrating device.

The following definitions are provided for the purpose of understanding the present subject matter and for construing the appended patent claims.

Definitions

Throughout the application, where devices or kits are described as having, including, or comprising specific components, or where processes are described as having, including, or comprising specific process steps, it is contemplated that devices or kits of the present teachings can also consist essentially of, or consist of, the recited components, and that the processes of the present teachings can also consist essentially of, or consist of, the recited process steps.

It is noted that, as used in this specification and the appended claims, the singular forms "a", "an", and "the" include plural references unless the context clearly dictates otherwise.

In the application, where an element or component is said to be included in and/or selected from a list of recited elements or components, it should be understood that the element or component can be any one of the recited elements or components, or the element or component can be selected from a group consisting of two or more of the recited elements or components. Further, it should be understood that elements and/or features of a composition or a method described herein can be combined in a variety of ways without departing from the spirit and scope of the present teachings, whether explicit or implicit herein.

The use of the terms "include," "includes", "including," "have," "has," or "having" should be generally understood as open-ended and non-limiting unless specifically stated otherwise.

The use of the singular herein includes the plural (and vice versa) unless specifically stated otherwise. In addition, where the use of the term "about" is before a quantitative value, the present teachings also include the specific quantitative value itself, unless specifically stated otherwise. As used herein, the term "about" refers to a ±10% variation from the nominal value unless otherwise indicated or inferred.

Unless defined otherwise, all technical and scientific terms used herein have the same meaning as commonly understood to one of ordinary skill in the art to which the presently described subject matter pertains.

Where a range of values is provided, for example, concentration ranges, percentage ranges, or ratio ranges, it is understood that each intervening value, to the tenth of the unit of the lower limit, unless the context clearly dictates otherwise, between the upper and lower limit of that range and any other stated or intervening value in that stated range, is encompassed within the described subject matter. The upper and lower limits of these smaller ranges may independently be included in the smaller ranges, and such embodiments are also encompassed within the described subject matter, subject to any specifically excluded limit in the stated range. Where the stated range includes one or both of the limits, ranges excluding either or both of those included limits are also included in the described subject matter.

Throughout the application, descriptions of various embodiments use "comprising" language. However, it will be understood by one of skill in the art, that in some specific instances, an embodiment can alternatively be described using the language "consisting essentially of" or "consisting of".

For purposes of better understanding the present teachings and in no way limiting the scope of the teachings, unless otherwise indicated, all numbers expressing quantities, percentages or proportions, and other numerical values used in the specification and claims, are to be understood as being modified in all instances by the term "about". Accordingly, unless indicated to the contrary, the numerical parameters set forth in the following specification and attached claims are approximations that may vary depending upon the desired properties sought to be obtained. At the very least, each numerical parameter should at least be construed in light of the number of reported significant digits and by applying ordinary rounding techniques.

An embodiment of a dry mouth hydrating device 20 includes a generally U-shaped tray 21 including a base 18 and two parallel arms 14, 16 extending from the base 18, as shown in FIG. 1. According to an embodiment, a cavity 12 is defined within the tray that provides a reservoir for the placement of a hydrating liquid. According to an embodiment, the cavity includes a first aperture 22 defined in the base of the tray and is connected in fluid communication to the cavity 12 by a tubing portion 13. The cavity 12 can be generally in the shape of the device and can extend within the base and arms of the tray 21.

The device 20 can be worn at night, while a user sleeps, to treat or prevent xerostomia. According to an embodiment, the tray 21 is adapted to surround the upper teeth of the wearer and is retained within the oral cavity along the dental arch between the lips and gums. The first aperture 22 is configured to allow the liquid to drip over the tongue of a user wearing the device 20.

According to an embodiment, the natural force of gravity can be used to deliver the liquid through the first aperture 22 into the mouth of the user. A pH of the liquid can be the same as saliva in the user's mouth. Accordingly, flow of the liquid into the mouth of the user is not dependent upon the user applying pressure on or biting down on the device 20.

Many types of liquids can be delivered orally by the device 20, such as, for example, water, nutrient enriched liquids, medicines, or any other ingestible solutions or liquids useful for keeping the mouth hydrated. In an embodiment, a pH of the liquid is the same as pH of the saliva in the user's mouth. In an embodiment, the liquid includes xylitol, a natural sugar alcohol found in plants, including many fruits and vegetables.

According to an embodiment, an amount of the liquid in the cavity 12 is sufficient to keep the mouth hydrated for about 6-8 hours, while a user sleeps. In an embodiment, the cavity 12 has a capacity of retaining about 36 ml to about 45 mL of the liquid. In an embodiment, a dripping rate of the liquid from the cavity 12 through the first aperture 22 is about 0.1 mL/min. In an exemplary embodiment, when the cavity 12 is provided with about 36 mL to about 45 mL of the liquid, the dripping rate is about 0.1 mL/min, and the device 20 can keep the mouth hydrated for about six hours while the user sleeps.

According to an embodiment, the device 20 can be pre-filled with the hydrating liquid, making the device 20 a single use device. The device 20 can be formed of a plastic material and/or other materials that are generally resilient and capable of deformation and shaping to conform for placement along an upper dental arch of the wearer of the device.

According to an embodiment, the natural force of gravity can deliver the hydrating liquid into the mouth of the wearer. In an embodiment, the tubing 13 can be macro-drip tubing extending from the cavity 12 to the first aperture 22. The macro-drip tubing can deliver a liquid flow of about 10-20 gtt/ml (i.e. number of drops in 1 ml). Macro-drip tubing can typically provide a variety of sizes or flow rates, e.g., 10 gtt/ml, 15 gtt/ml, and 20 gtt/ml. An appropriate flow rate for a wearer of the device 20 can be determined using the following equation:

$$\text{total volume} \times \text{drip factor} \div \text{time(hours of sleep)} = \text{flow rate(gtt/min)}.$$

Thus, macro-drip tubing that delivers a hydrating liquid at a flow of about 20 gtt/mL can be appropriate for a 40 mL total volume of liquid for a user that sleeps 6 hours (according to the formula: 40 mL×20÷360 min (i.e., 6 hours of sleep)=2.2 drops per min (gtt/min)). Such tubing delivers 2.2 drops per min, which equals about 0.120 mL/min (i.e., 7.2 mL per 1 hour).

Figure 2:
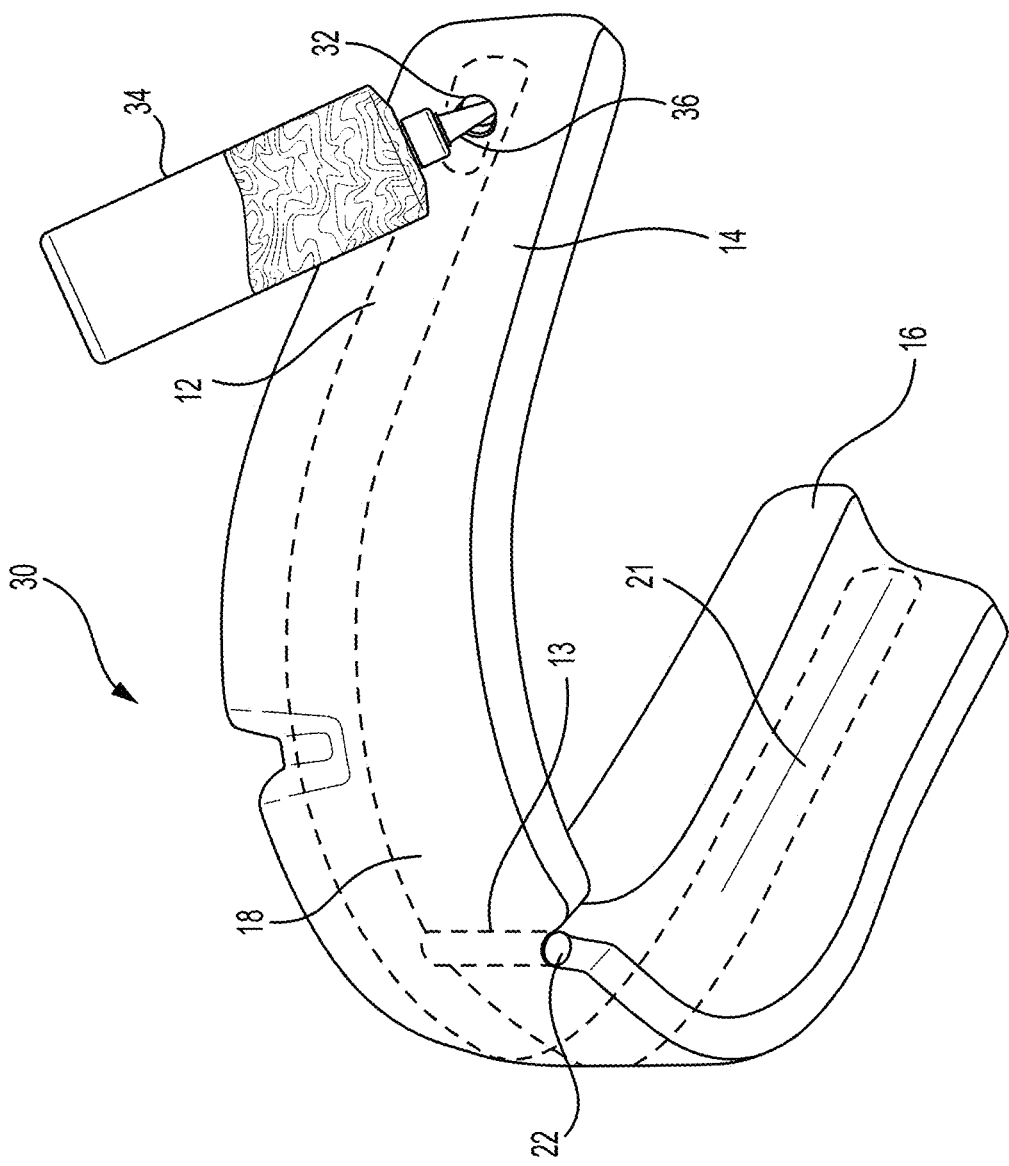
FIG. 2 is a perspective view of a second embodiment of a dry mouth hydrating device.

FIG. 2 depicts an alternative embodiment of the device 20, designated 30. The device 30 is identical to device 20 except that device 30 includes a second aperture 32. The second aperture 32 is in fluid communication with the cavity 12. The second aperture 32 can be resealable with a cap or plug, for example. According to an embodiment, the hydrating liquid can be added to the cavity 12 through the second aperture 32 in any suitable manner. In an embodiment, the device 30 is refillable and can be reused by the wearer.

Figure 3:
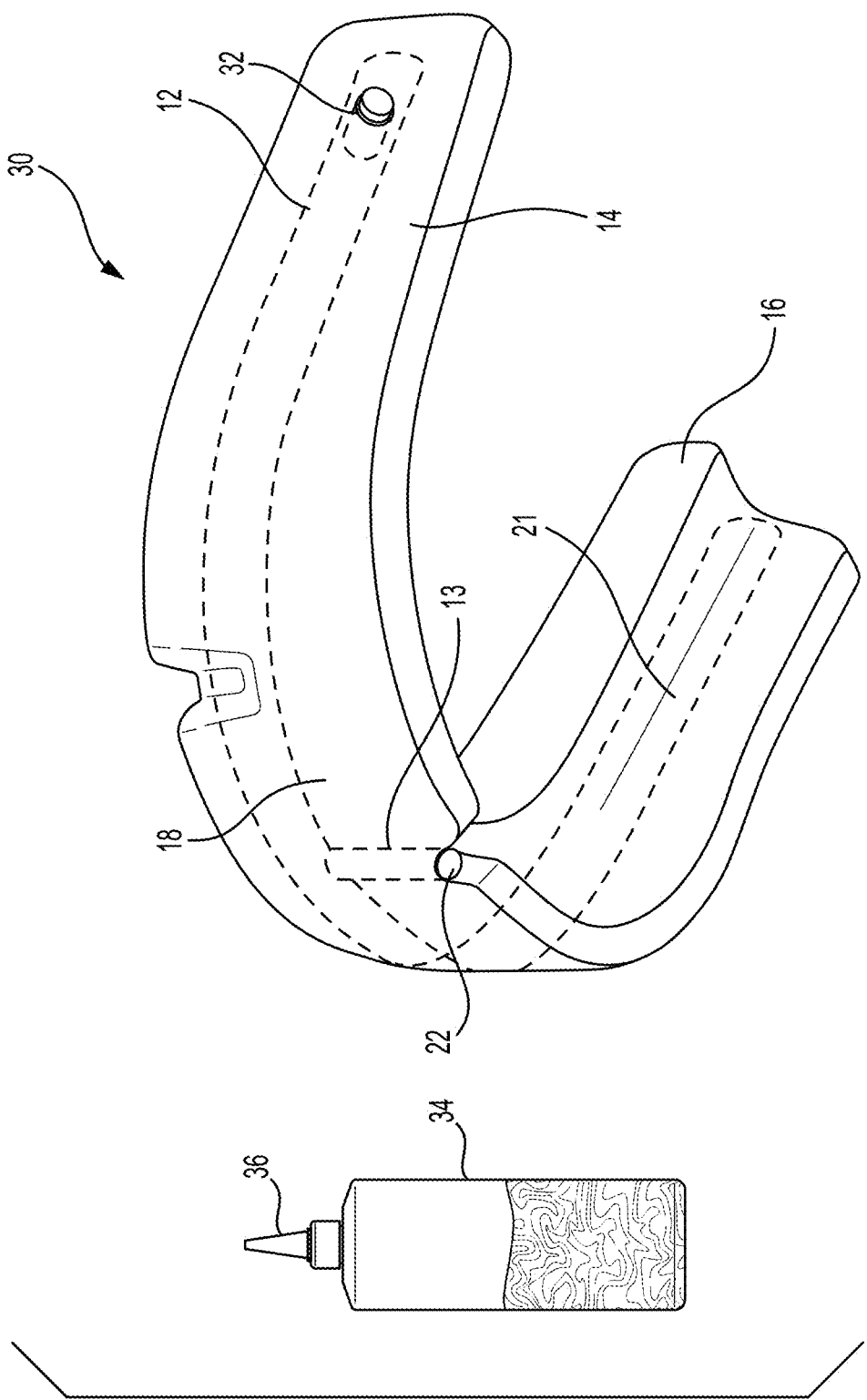
FIG. 3 is a perspective view of a kit for treating or preventing dry mouth.

An embodiment of the present teachings is related to a kit for treating or preventing dry mouth, as shown in FIG. 3. The kit can include the dry mouth hydrating device 30 and a refilling bottle 34. The refilling bottle 34 can include the hydrating liquid, e.g., a xylitol solution. According to an embodiment, the refilling bottle 34 includes a nozzle 36 configured to fit within the second aperture 32 for refilling the device 30.

It is to be understood that a dry mouth hydrating device is not limited to the specific embodiments described above, but encompasses any and all embodiments within the scope of the generic language of the following claims enabled by the embodiments described herein, or otherwise shown in the drawings or described above in terms sufficient to enable one of ordinary skill in the art to make and use the claimed subject matter.

The invention claimed is:

1. A dry mouth hydrating device, comprising:
   a U-shaped tray including a base and two parallel arms extending from the base wherein the U-shaped tray is adapted to cover a wearer's upper teeth;
   a cavity defined within the base and the two parallel arms of the U-shaped tray;
   a first aperture defined within the base of the U-shaped tray;
   a tubing portion extending between the cavity and the first aperture, wherein a hydrating liquid is gravitationally directed to travel from a first portion of the cavity defined within the two parallel arms of the U-shaped tray to a second portion of the cavity defined within the base of the U-shaped tray through the tubing portion and exit the first aperture; and
   a hydrating liquid within the cavity,
   wherein the tubing portion is macro-drip tubing.

2. The dry mouth hydrating device as recited in claim 1, further comprising a second aperture defined within the U-shaped tray, the second aperture being in fluid communication with the cavity and being resealable with a cap or plug.

3. The dry mouth hydrating device as recited in claim 1, wherein the hydrating liquid is a xylitol solution.

4. A method of treating or preventing dry mouth, comprising:
   positioning the dry mouth hydrating device as recited in claim 1 on the upper teeth of the wearer, whereby the hydrating liquid flows from the cavity through the first aperture, and into the mouth of the wearer.

5. The method of claim 4, wherein a dripping rate of the liquid from the cavity through the first aperture is about 0.1 mL/min.

6. A dry mouth hydrating device, comprising:
   a U-shaped tray including a base and two parallel arms extending from the base wherein the U-shaped tray is adapted to cover a wearers upper teeth;
     a cavity defined within the base and the two parallel arms of the U-shaped tray;
     a first aperture defined within the base of the U-shaped tray;
     a second aperture defined with the base of the U-shaped tray, the second aperture being in fluid communication with the cavity and being resealable; and
     a tubing portion extending between the cavity and the first aperture, wherein a hydrating liquid is gravitationally directed to travel from a first portion of the cavity defined within the two parallel arms of the U-shaped tray to a second portion of the cavity defined within the base of the U-shaped tray through the tubing portion and exit the first aperture and the second aperture, wherein the tubing portion is macro-drip tubing.

7. The dry mouth hydrating device as recited in claim 6, further comprising a hydrating liquid within the cavity.

8. The dry mouth hydrating device as recited in claim 7, wherein the hydrating liquid is a xylitol solution.

9. A method of treating or preventing dry mouth, comprising:
   positioning the dry mouth hydrating device as recited in claim 6 on the upper teeth of the wearer; and
   providing a hydrating liquid to the cavity, whereby the hydrating liquid flows from the cavity through the first aperture, and into the mouth of the wearer.

10. The method of claim 9, wherein a dripping rate of the liquid from the cavity through the first aperture is about 0.1 mL/min.

11. A kit comprising:
    a dry mouth hydrating device, said dry mouth hydrating device comprising:
      a U-shaped tray having a base and two parallel arms extending from the base wherein the U-shaped tray is adapted to cover a wearer's upper teeth;
      a cavity defined within the base and the two parallel arms of the U-shaped tray for receiving a hydrating liquid;
      a first aperture defined in the base of the U-shaped tray, said first aperture in fluid communication with the cavity;
      a second aperture defined in the base of the U-shaped tray, said second aperture in fluid communication with the cavity;
      a tubing portion provided between the first aperture and the cavity;
      a bottle including the hydrating liquid wherein said bottle attaches to said second aperture for applying the hydrating liquid into the cavity via the second aperture, wherein a hydrating liquid is gravitationally directed to travel from a first portion of the cavity defined within the two parallel arms of the U-shaped tray to a second portion of the cavity defined within the base of the U-shaped tray through the tubing portion and exit the first aperture and the second aperture; and
      a hydrating liquid within the cavity,
      wherein the tubing portion is macro-drip tubing.

12. The kit as recited in claim 11, wherein the bottle includes a nozzle extending from a top surface thereof, the nozzle configured to fit within the second aperture.

13. The kit as recited in claim 11, wherein the hydrating liquid comprises a xylitol solution.

* * * * *